Patented June 4, 1940

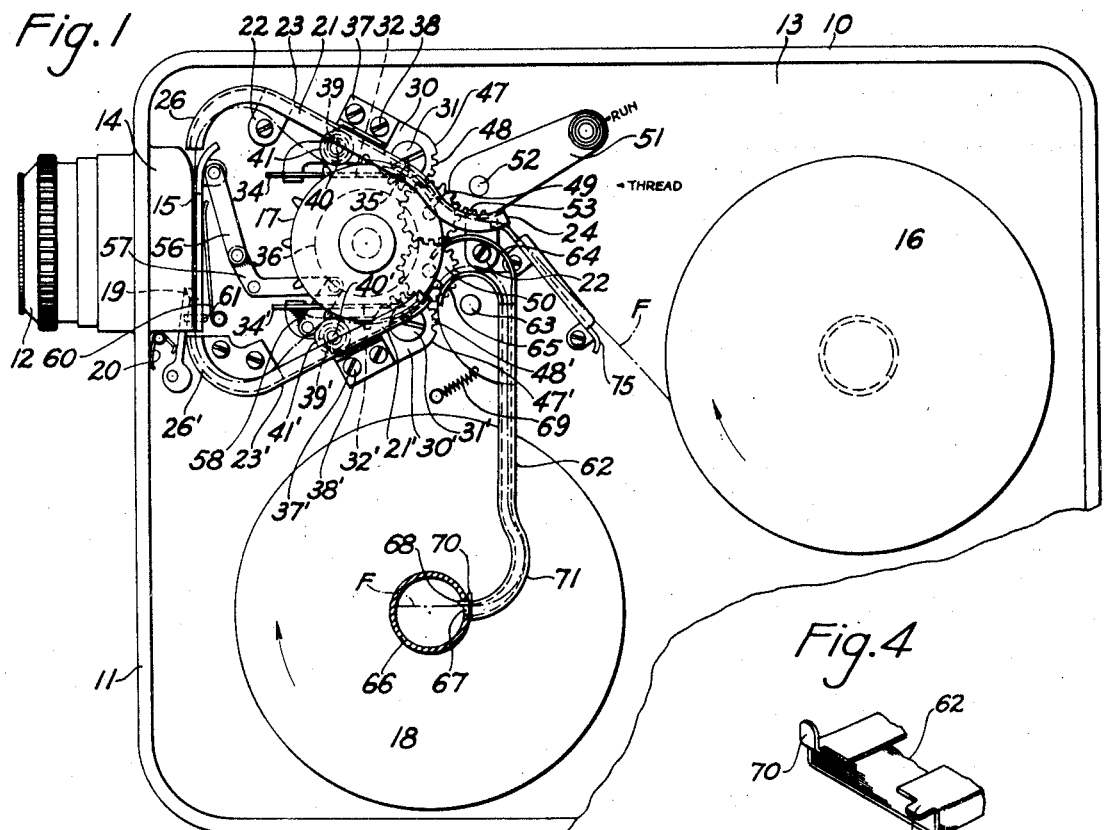

2,203,655

UNITED STATES PATENT OFFICE 2,203,655

PHOTOGRAPHIC APPARATUS

Aloysius E. Lechleitner and Lawrence R. Martin, Rochester, N. Y., assignors to Eastman Kodak Company, Rochester, N. Y., a corporation of New Jersey Application November 8, 1938, Serial No. 239,528

11 Claims. (Cl. 88—17)

The present invention relates in general to a motion picture apparatus which may be either a camera or a projector, and more particularly to a self-threading and loop-forming arrangement therefor.

One object of the present invention is to provide a motion picture apparatus with a self-threading and loop-forming arrangement wherewith a film strip can be properly threaded from a supply roll of film through the apparatus and automatically attached to the take-up roll by operation of the film feeding means. Another object is to provide such an arrangement whereby after threading the necessary flexible loop can be formed in front of and behind the film gate through the actuation of a single control member. And yet another object is to provide such a self-threading and loop-forming arrangement wherein the threading path of the film on either side of the gate is defined by a stationary guide member extending between the film feeding means and the gate, and the necessary flexible loops adjacent the gate are formed by pressing the film strip away from said stationary guide members thereby foreshortening the loops formed by said stationary guide members adjacent the gate. And another object is to provide such an arrangement whereby both loop forming means, one on either side of the gate, can be moved simultaneously to either their threading or loop-forming positions relative to said stationary guide members through the actuation of a single control member. And a further object is to provide such a threading arrangement that includes a guide channel for directing the film from the film feeding means located at the exit of the film gate to the take-up roll. And another object is to provide a guide channel of the type referred to which is arranged to insure an automatic connection of the film to the hub of the take-up roll. And another object is to provide a film threading and loop-forming arrangement of the type described which is simple in construction, efficient in operation, and adaptable for installation on known motion picture apparatus using sprockets for their film feeding mechanisms, without necessitating other than minor alterations in the same.

The novel features that we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawing in which, Fig. 1 is a partial side elevation of a particular form of motion picture camera with the cover removed, and incorporating a self-threading and loop-forming arrangement constructed in accordance with the preferred embodiment of the present invention, and showing the parts in loop-forming position, Fig. 2 is an enlarged plan view of the threading and loop-forming arrangement between the feeding sprocket and the entrance of the film gate as shown in Fig. 1, Fig. 3 is a side elevation of a part of the threading and loop forming arrangement shown in Fig. 1, and showing the parts in their threading position, Fig. 4 is a perspective detail of the exit end of the film guiding channel, and, Fig. 5 is a perspective of the movable threading guide and loop-forming member constituting an element of the novel self-threading and loop-forming arrangement.

Like reference characters refer to corresponding parts throughout the drawing.

Although for the purpose of disclosing the present self-threading and loop-forming arrangement we have chosen to show it in combination with a camera having a particular film path and film feeding means, both of which are adapted to the particular relative positions of the film gate, and the supply and take-up roll of film, it is to be understood that the invention is in no way limited to use in a camera, or the particular film path, or film feeding means, of the type shown; but could be used in a projector and with any film feeding means using a rotatable sprocket.

Referring now to Fig. 1, wherein a preferred embodiment of the invention is shown, 10 indicates the camera housing generally, the door of which is omitted, on the front wall 11 of which is mounted the objective 12. The camera housing 10 is divided longitudinally by partition or mechanism support 13 on one side of which the film handling mechanism is mounted to move a film strip F past the objective, and on the other side of which is mounted any suitable driving mechanism not shown for said film handling mechanism, which mechanism drives the film means in a known manner for properly exposing the film at the film gate.

In the camera housing 10 behind the objective 12 is a film gate of known form which may comprise a stationary gate member 14 integral with the front wall 11 of the camera housing, and a movable gate member 15 hinged at the bottom to the support 13 for movement toward the stationary gate member to hold the film flat in the gate, and for movement away from said stationary gate member for threading purposes, all as well known in the art. The supply roll of film 16 is rotatably mounted on the support 13 and the film is led therefrom over the upper side of a constantly driven sprocket 17, through the film gate, back to the other side of the sprocket, and finally to the take-up roll 18 mounted on a shaft, not shown, which extends through the support 13 and is frictionally driven by a suitable driving means, not shown, on the other side of the support for taking up the exposed film strip. The film may be fed intermittently through the film gate in a well-known manner as by an intermittently operated film claw 19 which is normally spring pressed toward the film strip by a spring 20 to engage the perforations thereof on the down stroke and thereby advance the film a frame at a time.

As is well known to those skilled in the art, where a film is fed to and from a film gate by a continuously operating sprocket, but is moved through said gate intermittently, flexible film loops must be provided between the gate and the continuously operated feeding means feeding the film to and from the same in order to permit each frame of the film to come to a complete stop opposite the film gate aperture. In motion picture apparatus which is adapted to be threaded by hand, these loops are provided for directly in the threading operation, but with self-threading arrangements where the film is adapted to be automatically threaded through the film path when moved by the film feeding means, some arrangement is usually made for forming the necessary flexible loops in advance of, and behind, the film gate after the threading operation has been completed. It is to such a threading and loop-forming arrangement that the present invention is directed.

Coming now to the invention, a stationary channel shaped guide member 21 having lugs 22 extending to one side thereof is fastened to said support 13 by passing screws through said lugs into the support, whereby said stationary guide member is adapted to extend into the film path and between the sprocket 17 and the entrance to the film gate. This stationary guide member is so formed and located relative to the sprocket and film gate that the base or film guiding surface thereof includes a straight portion 23 the plane of which is substantially tangent to the film engaging periphery of the sprocket, but is slightly spaced therefrom so that the film in its threading position defined thereby engages the teeth of the sprocket between their tip and their base, but does not necessarily contact the film engaging periphery of the sprocket. That portion of the stationary guide member 21 adjacent the sprocket is slightly curved so as to be concentric with a small arc of the periphery thereof to insure the leading end of the film engaging at least a part of two sprocket teeth, as shown. The leading end of said stationary guide member is turned up as shown at 24 to facilitate the insertion of the end of the film between the same and the sprocket, the sides of the guide member guiding the film laterally, the natural curvature of the film tending to cause the same to normally press against the base of the guide member whereby it follows the shape thereof. The base of the guide member 21 is provided with two elongated slots 25 at the edges thereof, see Fig. 2, spaced apart a distance equal to the spacing of the two rows of sprocket teeth on the sprocket, and through which the tips of said teeth are adapted to extend to insure the same engaging the film following the shape of the base thereof. That portion 26 of the guide member 21 adjacent the entrance of the film gate is curved as shown to form a supported and enlarged film loop from which the desired flexible loop is formed as hereinafter described.

A second stationary guide member 21', similar in shape to the guide member 21 above described, is fixed to the support 13 so as to extend between the exit end of the film gate and back to the sprocket 17 and form a threading path for the film strip. This guide member 21', like the one previously described, includes a curved portion 26' adjacent the exit of the film gate forming an enlarged loop, and includes a straight portion 23' extending to the periphery of the sprocket 17 and located relative thereto the same as the corresponding straight portion 23 of the guide member 21. The latter guide member is provided with longitudinal slots through which the sprocket teeth extend, as described in connection with guide member 21, to drivingly engage the film perforations for threading purposes when the same is directed toward the sprocket by the guide member not directly in contact with the periphery of said sprocket, but spaced a slight distance radially therefrom.

Associated with each of said stationary guide members 21 and 21' adjacent the sprocket, and operated in the same manner, is a threading and loop-forming member movable relative to each of said guide members between two positions; and since both of these threading and loop-forming members are constructed and operate in the same manner, only one will be described in detail, reference to the corresponding parts of the other being referred to by primes of the numerals used to indicate the parts of the one described.

Referring now to the drawing, and particularly Fig. 5, each of these threading and loop-forming members comprises a member 30 which is pivoted at 31 to the support 13 adjacent the periphery of the sprocket 17 and at one side of the same. This member 30 includes a guide shoe 32 which is connected thereto by an extension 33, which extension is sufficiently long to position said guide shoe so that it lies between the two rows of sprocket teeth at the under, or film engaging, side of the stationary guide member 21. This member 30 is so arranged relative to the stationary guide member 21, and the guide shoe 32 is so arranged on said member 30, that when the member 30 is pivoted to its threading position, see Fig. 3, the guide shoe 32 is moved to a position where it is parallel with the straight portion 23 of the guide member 21, but is slightly spaced therefrom to form the guide channel therewith through which the film is fed by the sprocket for its threading path. This guide shoe is provided primarily for the purpose of insuring that the end of the film when being threaded by the sprocket will follow the shape of the guide member 21 and will lie tight against the base thereof in its threading position. It is most important that the film in being threaded will engage the curved portion 26 of the guide member 21 so that sufficient film will be available for forming the flexible loop formed adjacent the gate as will be hereinafter described, and since the natural resiliency of the film due to its curvature cannot be depended upon for this occurrence, the film guide shoe 32 is provided to insure that the film closely follows the stationary guide at all points, particularly the curved portion 26 thereof. Referring to Figs. 3 and 5 it will be noticed that this guide shoe 32 is provided with a nose 34 which extends longitudinally of the shoe and adjacent the curved portion 26 when said shoe is in its threading position. This nose 34 due to the fact that it extends to the curved portion 26 serves to direct the end of the film strip directly against the base of said stationary guide member at this point, and thereby insures the film engaging said curved portion tightly throughout its length. The end of the guide shoe opposite the nose 34 is turned down slightly toward the sprocket 17, as indicated at 35, so as to provide a substantially V-shaped entrance to the film channel formed by said shoe and guide member for readily receiving the end of the film fed by the sprocket. After the apparatus has been properly threaded, the pivoted member 30 is moved to its loop-forming position, see Fig. 1, in which position the guide shoe 32 is moved away from the stationary guide member 21 toward the sprocket 17. To permit this movement of the pivoted member 30, the sprocket 17 is provided with a circumferential groove 36 between its two rows of sprocket teeth, which groove receives the guide shoe 32 and permits of its movement away from the stationary guide member when the member 30 is pivoted to its loop-forming position.

For loop-forming purposes an angular arm 37 is removably fastened to the pivoted member 30 by screws 38, and this arm includes a depending portion 39 which is turned over to rotatably support an axle 40 on either end of which are mounted grooved rollers 41. This arm 37 is so mounted on the pivoted member 30 that it extends laterally of the stationary guide member 21 and to the outside thereof, or the side of the guide member opposite that engaged by the film. The rollers 41 are so spaced as to engage the perforated margins of the film strip when the pivoted member 30 is moved to its loop-forming position, see Fig. 1, to press the film away from the guide member 21 and onto the sprocket teeth with an increased angle of wrap necessary for a proper feeding of the film by the sprocket in running position. The base of the guide member 21 is provided with an opening 42 through which the loop forming rollers 41 are adapted to pass in moving across the threading path of the film defined by said guide member, and the rollers 41 are grooved as shown, to receive the tips of the sprocket teeth. It will be noticed by referring to Figs. 1 and 3 that when the pivoted member 30 is in its threading position, the guide shoe 32 is moved toward the guide member 21 and the loop forming rollers are moved to the outside of the guide member, while when the pivoted member is moved to its loop-forming position, said guide shoe is moved away from the guide member 21 toward the sprocket, and the loop-forming rollers move across the threading path of the film to move the same away from the guide member 21 and into engagement with the sprocket over a substantial angle of wrap. It will be apparent by inspection of Fig. 1, that when the pivoted member 30 is moved to its loop-forming position, the loop-forming rollers thereon in pressing the film away from the guide member 21 and onto the sprocket with a substantial angle of wrap, foreshortens the threading loop formed by said guide member adjacent the entrance of the gate and forms a flexible loop satisfactory for running conditions. The angular arm 37 supporting the loop-forming rollers must be detachably mounted to the pivoted member, as shown, for the purpose of assembling the threading and loop-forming member on the support relative to the stationary guide member 21. Referring to Figs. 2 and 5 it will be noticed that in the assembled relation of these parts the side wall of the stationary guide member 21 adjacent the support 13 lies between the loop-forming roller 41 and the pivoted member 30, and since the space between the shoe 32 and said roller is less than the depth of said side wall, the guide member 21 could not conveniently be slipped into position after the pivoted member 30 was mounted on the support if both the guide shoe 32 and loop-forming roller 41 were integral with said pivoted member.

So that the threading and loop-forming members on either side of the film gate can be moved to or from their same respective threading or loop-forming positions simultaneously by movement of a single control member, the following structure is provided. Each of the pivoted members 30 and 30' are provided with a portion 47 or 47' which is circular about the pivot point 31, or 31', of the member, and this portion 47, or 47', is provided with gear teeth 48, or 48'. Gears 49 and 50 are rotatably mounted on the support 13 so as to be in engagement with one another, and one of each of these gears is in engagement with the teeth 47 and 47' on one of the pivoted members 30 and 30' respectively. The gear 49 is adapted to be rotated by oscillation of the control member 51 which is pivoted to the support at 52 and is provided with gear teeth 53 engaging gear 49. The gearing ratio between the several parts is such that when the control lever 51 is moved between the position marked "Run" and the position marked "Thread" on the support, pivoted members 30 and 30' will be pivoted on the support sufficiently to move the guide shoes 32 and 32' and the loop-forming rollers 41 and 41' between their threading and loop-forming positions. In order to effect a threading of the apparatus it is essential that the film gate be opened to receive the film fed therethrough by the sprocket 17. In order to effect a simultaneous opening of the film gate when the threading and loop-forming parts are moved to their threading position, we have shown the upper end of the movable gate member connected to the pivoted member 30' by a linkage including a lever 56 pivoted at one end to the upper end of the movable gate member, and the other end to one arm of a bellcrank 57 pivoted on the support and the other arm of which in turn is pivoted to one end of a second link 58, the other end of which is pivoted to the pivoted member 30'. By benefit of such a linkage, when the pivoted member 30' is moved to its threading position by actuation of the control member 51, the movable gate member is moved about its hinged lower end to its open position, and when the pivoted member is moved to its loop-forming position the movable gate member is returned to its film guiding position where it may be properly held by a spring 60, as well known in the art and as clearly shown in Figs. 1 and 3. It should be pointed out that the film gate while it may comprise a stationary member 14 and a movable member 15 hinged at the bottom for movement relative thereto for purposes of opening the gate, as well known in the art, the hinged structure for the bottom of the movable gate member should be such that the bottom of the movable gate member cannot be moved away from the stationary gate member a sufficient distance to allow the film passing therethrough to assume a plane so remote from the film claw that the same cannot engage the film perforations. This is imperative because, while the sprocket 17 serves to feed the film through the gate in threading the same, said film must be fed from the gate and back to the sprocket by the action of the film claw, and if the film in moving through the gate is not engaged by the claw, the self-threading action will not be operative. While the particular construction of an openable gate to care for this contingency is well known in the art in connection with other known self-threading arrangements, and forms no part of the present invention, no detailed construction need be shown or described herein; but a suitable construction has been indicated as comprising a pin 61 fixed to the movable gate member to extend into a recess in the stationary gate member, which construction will permit a limited or restricted movement of the bottom of the movable gate member 15 relative to the stationary gate member 14.

In order to insure the self-threading of a film by the film feeding means onto the take-up roll 18, a channel-shaped guide member 62 is pivoted to the support 13 at 63. This guide channel 62 is in alignment with the sprocket 17 and extends from a point adjacent said sprocket to a point adjacent the hub 66 of the take-up roll. The guide channel 62 for the most part takes the form best shown in Fig. 4 to form a substantially closed film path, but the entrance thereof is formed so as to readily receive the film fed off of the sprocket, and may include a back wall 64 curved as shown to extend into the circumferential groove 36 of the sprocket 17 below the film engaging periphery thereof, and a front wall 65 curved as shown to be spaced outside of the film engaging periphery of the sprocket. It will be readily appreciated that this particular channel entrance due to its formation and location relative to the sprocket 17 receives the end of the film when the same is fed off by the sprocket.

For automatically attaching the leading end of the film to the hub of the take-up roll, the exit end of the guide channel 62 is arranged to meet said hub substantially radially thereof. The hub 66 of the take-up roll is provided with a slot 67 extending axially thereof into which slot the film end is adapted to project for fastening the same thereto in a well-known manner. The exit end of the guide channel 62 is provided with a lug 68 at one side thereof and extending longitudinally thereof to enter the slot in the hub for momentarily aligning the exit end of the guide channel with said slot to permit the film to enter the same. The guide channel is normally urged against the periphery of the hub by a spring 69 fastened at one end to the support and at the other end to the guide channel. The exit end of said channel is provided with a second lug 70 extending perpendicularly to said first-mentioned lug, and which is adapted to engage the periphery of said hub when lug 68 enters the slot to limit the extent to which lug 68 enters said slot. If by the time the film end reaches the end of the guide channel 62 in the threading operation the lug 68 has engaged the slot 67 to momentarily stop movement of the take-up roll, which by the way can be easily stopped since it is frictionally driven in a well-known manner, with the slot in alignment with the exit end of the guide channel 62, the film will enter the slot and be projected therethrough until it abuts the inner surface of the hub where it can go no further. Now if the film is being continuously fed to the take-up roll and is stopped by engaging the inner surface of the hub thereof, it will tend to back up in the channel 62. The channel member 62 is provided with a curved portion as indicated at 71 the center of curvature of which is eccentric to the center of the take-up hub, and due to the position of the curved portion relative to the hub of the take-up roll the effect of building up of the film in the channel will exert a force against said channel in a direction substantially radially of said hub so as to force the channel about its pivot to automatically disengage the lug 68 from engagement with the slot in the hub. Now as the film begins to wind up on the hub the lugs 68 and 70 on the exit end thereof will ride on the margins of the outer convolutions of the film where it will do no damage, and as the roll builds up and the channel guide is caused to rotate about its pivot, the entrance end of said channel guide will be received in the circumferential groove of the sprocket.

In the event that the exit end of the guide channel 62 does not become aligned with the slot 67 in the hub 66 of the take-up roll 18 by the time the end of the film reaches that point in its film path, the film will tend to back up in the enlarged entrance of the channel until the slot does come into alignment with the exit end thereof, whereupon the natural elasticity of the film due to its being built up in the channel will rapidly force the same out of the exit end of the channel and into the slot in the hub. This occurrence is not very frequent, however, because as soon as the film feeding mechanism is started to thread the film, the take-up roll is also started to rotate; and it is certain, with possibly the exception that the frictional drive of the take-up roll might slip, that the take-up roll will make at least one complete revolution before the end of the film reaches the exit end of the film guiding channel 62, so that the lug 68 on the exit end of the channel will have engaged the slot in the hub by the time the end of the film reaches that point in said film path.

The operation of the disclosed self-threading and loop-forming arrangement is as follows: assuming that one is ready to thread the camera, the first step is to move the control member 51 to the position marked "Thread," as shown in Fig. 3. This causes each of the pivoted members 30 and 30' to be moved to their threading positions wherein the guide shoes 32 and 32' carried thereby, respectively, are moved to a position where they form a threading channel with the stationary guide members 21 and 21', and causes the loop-forming rollers 41 and 41' carried by said pivoted members to be moved across the stationary guide members to the outside thereof. Movement of the control member 51 to this position also effects the simultaneous opening of the film gate. Now the film feeding mechanism is started and the end of the film from the supply roll is merely directed between the sprocket and the stationary guide member 21 until the sprocket teeth engage the perforations of the film and assume control thereof. The sprocket then feeds the film to the film gate where it is picked up by the film claw to be fed thereby into the stationary guide member 21' which directs it back to the sprocket 17, and which in turn feeds it into and through the channel guide member 62 to the hub of the take-up roll to which it is automatically attached as described. Film guide member 75 attached to the support between the supply roll 16 and the sprocket 17 merely serves to support that portion of the film between the two during the running operation. During the threading operation it should be remembered that the film is directed into surface contact with the base of the stationary guide member 21 by the guide shoes 32 and 32' where it will be held by the resiliency of the film due to its curvature even after the guide shoes are removed. Now when the film has been threaded through the apparatus and attached to the take-up roll, the control member 51 is moved to the position marked "Run," as shown in Fig. 1, while the film feeding mechanism is still running or after it has been stopped. This movement of the control member effects an oscillation of the pivot members 30 and 30' to remove the guide shoes 32 and 32' from the film path and to cause the loop-forming rollers 41 and 41' to move across said film path and move the film strip away from the stationary guide members 21 and 21' and into a suitable angle of wrap with the sprocket, in which position it holds the film during running operation. The movement of the loop-forming rollers foreshortens the threading loop between the sprocket and either end of the gate to form the desired flexible running loop. The film gate is moved to its closed position when the control member is moved to the position marked "Run." If at any time during the running operation the flexible film loop should become lost, it may be immediately restored by merely moving the control member to its "Thread" position for an instant and back to its "Run" position without stopping the film feeding apparatus.

Although we have shown and described a specific embodiment of our invention, we are fully aware that many modifications thereof are possible. Our invention, therefore, is not to be restricted except in so far as is necessitated by the prior art and by the spirit of the appended claims.

Having thus described our invention what we claim is new and desire to secure by Letters Patent of the United States is:

1. In a photographic apparatus the combination with a support, a film gate, a supply roll of film, a sprocket for feeding the film from said supply roll to and through said gate, of a threading and loop forming means between said sprocket and said gate, said means including a stationary guide member on said support and extending between said sprocket and said gate adapted to be engaged by said film for directing the same, said guide member having a straight portion substantially tangential to said sprocket adapted to hold the film strip in engagement with the teeth of the sprocket, and a curved portion immediately in advance of said gate, and a loop forming means mounted on said support to move to and from the periphery of said sprocket between a loop forming and a threading position, respectively, said loop forming means mounted on said support adjacent said stationary guide member, whereby it is adapted to move across the plane of the straight portion thereof and to the rear side thereof when moved to its threading position, and is adapted to engage the film and move the same out of engagement with said stationary guide member when moved to its loop forming position.

2. In a motion picture apparatus the combination with a support, a film gate, a supply roll of film, a sprocket rotatably mounted on said support for feeding the film from said supply roll to and through said film gate, of means for directing the film from said sprocket to the film gate and forming the necessary film loop in advance of the film gate, said means including a stationary curved guide member on said support extending between the sprocket and the entrance to the film gate, and a threading and loop forming member movable between a loop forming position and a threading position relative to said guide member, said means when in its threading position forming a film channel with said guide member through which the film is adapted to be fed by the sprocket to conform to the shape of the guide member, and when its loop forming position forcing said film against the periphery of said sprocket and removing it from engagement with said guide member to form a flexible loop in advance of the film gate.

3. In a motion picture apparatus the combination with a support, a film gate, a supply roll of film, a sprocket rotatably mounted on said support for engaging and feeding the film strip from said supply roll to and through said film gate, of film threading and loop forming means between said sprocket and said film gate for threading a film fed by said sprocket through said gate and forming a flexible loop in advance of the film gate, said means including, a stationary curved guide member on said support and extending between the sprocket and said film gate to form the threading path for the film, in which path the film contacts but a small arc of the periphery of the sprocket, a member mounted on said support to move between a threading position wherein it forms with said guide shoe a film channel through which the film is adapted to be threaded and confined to engagement with said guide member, and a loop forming position wherein it is removed from said guide member, a loop forming roller mounted on said support to move between a threading position wherein it is removed from said sprocket, and a loop forming position wherein it engages the film and forces the same away from said stationary guide member into an increased angle of wrap with said sprocket, whereby a flexible loop is formed in the film in advance of said gate, and means for simultaneously moving said shoe and loop forming roller to and from their respective threading or loop forming positions.

4. In a motion picture apparatus the combination with a support, a film gate, a supply roll of film, a sprocket rotatably mounted on said support for feeding a film from said supply roll to and through said gate, of a threading and loop forming means on said support for defining the path of the film when fed by the sprocket, said means including a stationary guide member on the support extending substantially tangentially to the sprocket and including a curved portion in advance of the film gate, said guide member defining the threading path of the film and provided with a slot through which the sprocket teeth are adapted to extend to engage the perforations of the film when the same is directed by said guide member over the sprocket in threading position, a movable guide shoe mounted on said support adjacent said stationary guide member to move between a threading position relative thereto, wherein it forms a channel through which the film passes upon leaving the sprocket, and a loop forming position, wherein it is moved away from said stationary guide member and the film path, a loop former mounted on said support to move between a threading position relative to said stationary guide member and sprocket, wherein it is removed from the film path, and a loop forming position wherein it engages that portion of the film extending between the sprocket and the film gate and moves the same toward the sprocket to increase the angle of wrap therearound, and means for moving said movable guide shoe and said loop former to and from their threading and loop forming positions simultaneously.

5. In a motion picture apparatus the combination with a support, a film gate, a supply roll of film, a sprocket rotatably mounted on said support for feeding a film from said supply roll to and through said gate, of a film threading and loop forming means between said sprocket and said gate, said means including a stationary guide member on said support and extending between the sprocket and said film gate to form the threading path for the film, in which path the film contacts but a small arc of the periphery of the sprocket, a threading and loop forming member mounted on said support to move between a threading and a loop forming position relative to said stationary guide member and sprocket, and including a guide shoe adapted when said threading and loop forming member is in its threading position to be moved into a plane parallel to but spaced from the plane of the stationary guide member to form a film guiding channel at the leaving side of said sprocket, and to be removed from said guide member in the loop forming position of said threading and loop forming member, said threading and loop forming member also including a loop forming roller adapted when said member is in its threading position to be located at the side of said stationary guide member away from said sprocket, and adapted when said threading and loop forming member is moved to its loop forming position to move across the plane of said stationary guide member, whereby it engages the film strip and presses the same from said stationary guide member and into engagement with an arc of the periphery of said sprocket greater than the arc of the periphery thereof engaged during the threading position of the film, and means for moving said threading and loop forming member between its two positions.

6. In a motion picture apparatus the combination with a support, a film gate, a supply roll of film, a sprocket rotatably mounted on said support for feeding a film from said supply roll to and through said gate, of a film threading and loop forming means between said sprocket and said gate, said means including a stationary guide member on said support and extending between the sprocket and said film gate to form a threading path for the film, that portion of said guide member adjacent the sprocket lying in a plane substantially parallel to a tangent to the periphery of the sprocket and provided with an opening therein, a pivoted member mounted on said support adjacent said sprocket to move between a threading and loop forming position, said pivoted member including a guide shoe extending to the under side of said stationary guide member, and adapted to move into a plane parallel to but spaced from the plane of the straight portion of said guide member to form a threading channel through which the film is directed by the sprocket when said pivoted member is moved to its threading position, and adapted to be moved away from said guide member when the pivoted member is moved to its loop forming position, said pivoted member also including a loop forming roller arranged to extend across said stationary guide member on the side thereof opposite the sprocket when the pivoted member is in its threading position, and adapted to pass through said opening in the stationary guide member and across the plane thereof when said pivoted member is moved to its threading position, whereby it engages said film strip and presses the same away from said stationary guide member onto the periphery of said sprocket, and means for moving said pivoted member between its two positions.

7. In a motion picture apparatus the combination with a support, a film gate, a supply roll of film, a sprocket rotatably mounted on said support for feeding a film from said supply roll to and through said gate, of a film threading and loop forming means between said sprocket and said gate, said means including a stationary guide member on said support and extending between the sprocket and said film gate to form a threading path for the film, that portion of said guide member adjacent the sprocket lying in a plane substantially parallel to a tangent to the periphery of the sprocket and provided with an opening therein, a pivoted member mounted on said support adjacent said sprocket to move between a threading and loop forming position, said pivoted member including a guide shoe extending to the under side of said stationary guide member, and adapted to move into a plane parallel to but spaced from the plane of the straight portion of said guide member to form a threading channel through which the film is directed by the sprocket when said pivoted member is moved to its threading position, and adapted to be moved away from said guide member when the pivoted member is moved to its loop forming position, said pivoted member also including a loop forming roller arranged to extend across said stationary guide member on the side thereof opposite the sprocket when the pivoted member is in its threading position, and adapted to pass through said opening in the stationary guide member and across the plane thereof when said pivoted member is moved to its threading position, whereby it engages said film strip and presses the same away from said stationary guide member onto the periphery of said sprocket, and means for moving said pivoted member between its two positions, said means including gear teeth on said pivoted member, a movable gear member engaging said gear teeth, and operable means for moving said movable gear member through a given range.

8. In a motion picture apparatus the combination with a support, an openable film gate, a supply roll of film, a take-up roll, a sprocket rotatably mounted on said support for feeding a film from said supply roll, to said sprocket, and to said take-up roll, of a threading and loop forming means on said support for defining the threading path of film from said sprocket to the gate, and from said gate back to said sprocket, said means including a pair of stationary guide members on the support, one thereof extending between the sprocket and the entrance to the film gate, the other extending between the exit of the film gate and the sprocket, and each thereof including a straight portion substantially tangential to the sprocket and a curved portion forming a film loop adjacent the sprocket, a threading and loop forming member mounted on said support to move between a threading and loop forming position relative to said sprocket and each of said stationary guide members, and including a guide shoe adapted when said threading and loop forming member is in its threading position to be moved into a plane parallel to but spaced from the plane of its respective stationary guide member to form a film guiding channel adjacent the sprocket, and to be removed from said guide member in the loop forming position of said threading and loop forming member, each of said threading and loop forming members also including a loop forming roller adapted when said threading and loop forming member is in its threading position to be located at the side of its respective guide member away from the sprocket, and adapted, when said threading and loop forming member is moved to its loop forming position, to move across the plane of the straight portion of its respective stationary guide member, whereby it engages the film strip and presses the same from the guide member and into engagement with an arc of the periphery of the sprocket greater than the arc of the periphery thereof engaged when the same is in its threaded path, and means for simultaneously opening said gate and moving each of said threading and loop forming members to their threading position.

9. In a motion picture apparatus the combination with a support, an openable film gate, a supply roll of film, a take-up roll, a sprocket rotatably mounted on said support for feeding a film from said supply roll, to said sprocket, and to said take-up roll, of a threading and loop forming means on said support for defining the threading path of film from said sprocket to the gate, and from said gate back to said sprocket, said means including a pair of stationary guide members on the support, one thereof extending between the sprocket and the entrance to the film gate, the other extending between the exit of the film gate and the sprocket, and each thereof including a straight portion substantially tangential to the sprocket and a curved portion forming a film loop adjacent the sprocket, a threading and loop forming member mounted on said support to move between a threading and loop forming position relative to said sprocket and each of said stationary guide members, and including a guide shoe adapted when said threading and loop forming member is in its threading position to be moved into a plane parallel to but spaced from the plane of its respective stationary guide member to form a film guiding channel adjacent the sprocket, and to be removed from said guide member in the loop forming position of said threading and loop forming member, said threading and loop forming member also including a loop forming roller adapted when said threading and loop forming member is in its threading position to be located at the side of its respective guide member away from the sprocket, and adapted, when said threading and loop forming member is moved to its loop forming position, to move across the plane of the straight portion of its respective stationary guide member, whereby it engages the film strip and presses the same from the guide member and into engagement with an arc of the periphery of the sprocket greater than the arc of the periphery thereof engaged when the same is in its threaded path, and means for simultaneously opening said gate and moving each of said threading and loop forming members to their threading position, said means including gear teeth on each of said threading and loop forming members, a gear train operably connecting the gear teeth on each of said threading and loop forming members, a linkage operably connecting said gate to one of said threading and loop forming members, whereby movement of said member effects an opening of said gate, and a single operating member for actuating said gear train.

10. In a motion picture apparatus the combination with a support, a film gate, a supply roll of film, a take-up roll having a slotted hub, means for feeding a film strip from said supply roll, through said film gate, and from said film gate to said take-up roll, said means including a sprocket adapted to engage the film strip as it leaves the gate and feed the same to said take-up roll, of self-threading means on the support for directing the film through the apparatus and into the hub of the take-up roll when the same is moved by the film feeding means, said self-threading means including a stationary guide member defining a threading path from the feeding means in advance of the film gate to said film gate, a stationary guide member defining a threading path from the exit of said gate to said sprocket, and a guide channel pivoted to said support and having an enlarged entrance located in the film path at that point where the film leaves said sprocket, and having an exit adjacent the hub of said take-up roll, the exit end of said guide channel adapted to extend substantially radially of and into engagement with the periphery of the hub of said take-up roll when the same is empty, and adapted to releasably engage the slot in said hub for aligning itself with said slot whereby said guide channel is adapted to direct the film into the slot in the hub of said take-up reel.

11. In a motion picture apparatus the combination with a support, a film gate, a supply roll of film, a take-up roll having a slotted hub, means for feeding a film strip from said supply roll, through said film gate, and from said film gate to said take-up roll, said means including a film sprocket adapted to engage the film as it leaves the gate and feed the same to the take-up roll, said sprocket having a peripheral groove the bottom of which is situated below the periphery thereof engaged by the film, of self-threading means on the support for directing the film through the apparatus and into the hub of the take-up roll when the same is moved by the film feeding means, said self-threading means including a stationary guide member defining a threading path from the feeding means in advance of the film gate to said gate, a stationary guide member defining a threading path from the exit of said gate to said sprocket, and a guide channel pivoted to said support and having an enlarged entrance located in the film path in alignment with the peripheral groove in said sprocket at that point where the film leaves said sprocket, and having an exit end adjacent and extending radially of the hub of said take-up spool, resilient means normally rotating said guide channel about its pivot, whereby the exit end of said channel is forced against the periphery of said hub, the exit end of said guide channel adapted to releasably engage said slot to hold the slot in said hub in alignment with the exit of said guide channel whereby the film passes radially into said hub.

ALOYSIUS E. LECHLEITNER.
LAWRENCE R. MARTIN.